United States Patent
Supper (10) Patent No.: US 10,575,084 B1
(45) Date of Patent: *Feb. 25, 2020

(54) CONNECTOR FOR IN-EAR SYSTEMS

(71) Applicant: BANZAI DEFENSE GROUP, LLC, Weatherford, TX (US)

(72) Inventor: Elijah Alexander Supper, Weatherford, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/680,615

(22) Filed: Aug. 18, 2017

Related U.S. Application Data (63) Continuation-in-part of application No. 15/489,115, filed on Apr. 17, 2017, now Pat. No. 9,913,019, which is a continuation-in-part of application No. 14/696,029, filed on Apr. 24, 2015, now Pat. No. 9,655,399.

(60) Provisional application No. 62/048,192, filed on Sep. 9, 2014.

(51) Int. Cl.
| | | |
|---|---|---|
| *H04R 1/10* | (2006.01) | |
| *H04R 5/033* | (2006.01) | |
| *H01R 27/00* | (2006.01) | |
| *G10K 11/178* | (2006.01) | |
| *A42B 3/16* | (2006.01) | |
| *A42B 3/28* | (2006.01) | |
| *A42B 3/30* | (2006.01) | |
| *B64D 11/00* | (2006.01) | |

(52) U.S. Cl.
CPC ......... *H04R 1/1041* (2013.01); *G10K 11/178* (2013.01); *H01R 27/00* (2013.01); *H04R 5/033* (2013.01); *A42B 3/163* (2013.01); *A42B 3/288* (2013.01); *A42B 3/303* (2013.01); *B64D 11/0015* (2013.01); *G10K 2210/1281* (2013.01)

(58) Field of Classification Search
CPC .. H04R 1/1041; H04R 5/033; G10K 11/1788; G10K 11/178; G10K 2210/1281; H01R 27/00; A42B 3/163; A42B 3/288; A42B 3/303; B64D 11/0015
USPC .......................................................... 381/302
See application file for complete search history.

(56) References Cited

U.S. PATENT DOCUMENTS

| | | | |
|---|---|---|---|
| 8,750,534 B2 | 6/2014 | Yamkovoy et al. | |
| 8,750,535 B2 | 6/2014 | Yamkovoy et al. | |
| 2001/0023141 A1* | 9/2001 | Chang ...................... | G06F 1/16 |
| | | | 439/76.1 |

(Continued)

*Primary Examiner* — Vivian C Chin
*Assistant Examiner* — Douglas J Suthers
(74) *Attorney, Agent, or Firm* — Rao DeBoer Osterrieder, PLLC; Erik J. Osterrieder (57) ABSTRACT

Disclosed is a connector for providing audio signals. The connector can include an audio signal and power cable having a first end and a second end, and an interface communication connector disposed at least proximate to the first end. Further, the connector can include a ground, power, and audio signal connector disposed at least proximate to the second end, wherein the ground, power, and audio signal connector is configured to accept a plurality of different audio signal and power cables from different noise-protection devices having differing pin configurations. Further still, the connector can include at least a first audio input signal cable in contact with the audio signal and power cable, wherein the audio input signal cable is configured for transmitting one or more of the audio signals through the interface communication connector to at least one of a vehicle and an extra-vehicular source.

20 Claims, 8 Drawing Sheets

(56) References Cited

U.S. PATENT DOCUMENTS

| | | | |
|---|---|---|---|
| 2004/0091128 A1* | 5/2004 | Park | H04R 1/06 381/380 |
| 2012/0155689 A1* | 6/2012 | Milodzikowski | H04R 1/1016 381/379 |
| 2012/0308030 A1 | 12/2012 | Yamkovoy et al. | |
| 2012/0308048 A1* | 12/2012 | Yamkovoy | H04R 1/1091 381/111 |

* cited by examiner

CONNECTOR FOR IN-EAR SYSTEMS

CROSS-REFERENCE TO RELATED APPLICATIONS

The current application is a continuation-in-part and claims priority to U.S. Nonprovisional patent application Ser. No. 15/489,115 filed on Apr. 17, 2017 and titled "EARPLUG CONNECTOR FOR IN-EAR SYSTEMS," which claims priority to U.S. Nonprovisional patent application Ser. No. 14/696,029 filed on Apr. 24, 2015, now issued as U.S. Pat. No. 9,655,399 on May 23, 2017 and titled "EARPLUG CONNECTOR FOR MULTI-SIGNAL AND MULTI-POWER RECEIVING HELMETS," which claims priority to U.S. Provisional Patent Application Ser. No. 62/048,192 filed on Sep. 9, 2014 and titled "CONTINUOUSLY OPERABLE EARPLUG CONNECTOR FOR MULTI-SIGNAL AND MULTI-POWER RECEIVING HELMETS." These references are hereby incorporated in their entirety.

STATEMENT REGARDING FEDERALLY SPONSORED RESEARCH OR DEVELOPMENT

Not applicable.

BACKGROUND

Field of the Disclosure

The current embodiments generally relate to a connector providing noise reduction and the transfer of audio signals.

Background of the Disclosure

Many commercially available connectors and/or adapters are used for communications, but few of them provide the capabilities of noise reduction, power separation and transfer of audio signals.

The current embodiments provide for an improved connector for audio transmissions with noise reduction, and can communicate critical audio and audio signals from a user to a vehicle or an extravehicular source.

The current embodiments also provide a connector for reduced audio echo effects for pilots by isolating the audio signal from a vehicle or an extra-vehicular source to ears of a pilot.

There is a need for an audio separator that functions between a user wearing a helmet without the need for an adapter, if applicable.

BRIEF DESCRIPTION OF THE DRAWING

For a more detailed description of an embodiment of the present disclosure, reference will now be made to the accompanying drawing, wherein.

The present embodiments are detailed below with reference to the listed Figures.

DETAILED DESCRIPTION

In the following discussion and in the claims, the terms "including" and "comprising" are used in an open-ended fashion, and thus should be interpreted to mean "including, but not limited to . . . ".

The current embodiments generally relate to a connector providing noise reduction and transfer of audio signals.

The current embodiments further relate to a connector providing noise reduction, power separation and transfer of audio signals.

In embodiments, the connector can be selectively switchable to provide power and to stop power to noise-reducing devices usable within a helmet.

In embodiments, the connector can integrate specialized electronics into custom-molded ear pieces and ear-protection devices allowing a user to receive clear audio signals while simultaneously protecting the user's ears from damaging ambient noises.

In embodiments, the connector can prevent accidents by delivering clear air-traffic-control communications to pilots and/or air crew even during extremely loud noises generated by a vehicle malfunctions or otherwise.

In embodiments, the connector can prevent injuries onboard the vehicle that can occur when the air crew fails to hear commands from a pilot, such as to strap in during a steep descent or a roll to avoid an obstacle.

In embodiments, the connector can enable a user to more efficiently multitask and process information while operating a complex and high-speed vehicle.

The term "a multi-pin connector" as used herein can refer to a connector with multiple pins that can be configured to transfer audio signals. In embodiments, the connector with multiple pins can be configured to simultaneously transfer audio signals and power.

The term "multi-pin signal separator" as used herein can refer to a housing made of a shock resistant material, such as plastic, natural rubber or synthetic rubber, water resistant material, metal coated with rubber, electro-magnetically shielded material, and combinations thereof, which enables the transmission of clear audio signals.

The term "vehicle" as used herein can refer to any known vehicle in the industry, which can include, but is not limited to: aircraft, a commercial jet aircraft, a non-commercial jet aircraft, a non-jet aircraft, aircraft trainers, helicopters, space shuttles, simulators, a space exploration vehicle automobiles, motorcycles, trains, rockets for connecting to a space station or exploring space, and combinations thereof. The term "vehicle" as used herein can also refer to commercial vehicles, non-commercial vehicles, vehicle trainers or simulators, a boat, a car, a rotor craft, an underwater vessel, a submarine, a space craft, a remotely operated vehicle, deep ocean exploration vehicles, a locomotive, similar vehicles, or combinations thereof.

The term "audio signals" as used herein can refer to any audio signals and/or transmissions that can come from a known device with bidirectional capabilities, air traffic control communication, airborne asset communication, ground based asset communication that can be communicating with aircraft, crew member communication, one or more originating communications, system advisories, system warnings, malfunction alerts, and combinations thereof.

The term "in-ear system" can refer to any device known that is capable of transmitting and receiving audio signals, communication, and/or transmissions. As examples, an in-ear system can include, but is not limited to: earbuds, earplugs, headphones, in-ear monitors, or various devices known in the art, which can be inserted into the ear for communication and or transmission of audios signals and communication in wired or wireless communication and connection.

The term "helmet" as used herein can refer to a helmet or head-protection apparatus worn by a user, wherein the user can be a pilot, copilot, boat operator, race car driver, or any person that can require audio information, video information, flight information, and power from both the vehicle and an extra-vehicular source, such as an outside agency, a control tower, a series of control towers, or any source that is capable of communications, such as satellite towers, cellular towers and the like.

The term "noise-reduction device" as used herein can refer to a device that receives (either passively or actively) electrical power and generates audio signals that are opposite in phase of the ambient noise and/or the directed audio transmissions being received.

The term "interface communication connector" as used herein can refer to a connector configured to provide audio signals, power, or audio signals and power from the vehicle to the user.

The term "interface connector" as used herein can refer to a connector that provides the transfer of various components from the vehicle to the user of the vehicle.

The connector can provide audio signals originating from at least one of: a vehicle and an extra-vehicular source and provide power to a noise-reduction device contained in at least one ear-protection device, which can be worn under a helmet, for use while operating the vehicle.

The connector can have a multi-pin connector, which can be used for connecting to or being in communication with an audio signal and power cable, which can receive audio signals, power, and audio signals and power. In embodiments, the multi-pin connector can receive audio signals, power, and audio signals and power from an interface communication connector of an interface multifunction connector that can also engage an interface assembly connected to a vehicle.

In embodiments, the multi-pin connector can be configured to accept a plurality of different audio signals and power cables with differing pin configurations. In embodiments, the multi-pin connector may not require an additional adapter.

The connector can have a ground, power, and audio signal connector in communication with the multi-pin connector for transferring audio signals, power, and audio signals and power to a noise-reduction device. In embodiments, the noise-reduction device can be in an ear-protection device.

In embodiments, the ground, power, and audio signal connector can be configured to accept a plurality of different power cords for different noise-protection devices having differing pin configurations. In embodiments, the ground, power, and audio signal connector may not require an additional adapter.

The connector can have an audio output for transferring audio signals from the multi-pin connector to at least one of: an in-ear system, earbuds, earplugs, headphones, and at least one ear-protection device. An in-ear system, can be any known system either wired or wireless that can be used for audio communications through a user's ear.

The connector can have a multi-pin signal separator in electrical and audio communication with the multi-pin connector, the ground, power, and audio signal connector, and the audio output.

In embodiments, the multi-pin signal separator can be configured for receiving all or a portion of the audio signals from at least one of: the multi-pin connector, the ground, power, audio signal connector, and the audio output and can selectively pass all or a portion of the audio signals to at least one of: in-ear system, earbuds, earplugs, headphones, and the at least one ear-protection device while transferring power to the noise-reduction device.

In embodiments, the audio output can also connect to an adapter, in either wired or wireless communication, wherein the adapter is configured to transmit or transfer the audio signals from the multi-pin connector to at least one of: an in-ear system and at least one ear-protection device.

In embodiments, the inputs, outputs, and various cables can transfer audio signals, power, or both audio signals and power. In embodiments the transmission of the audio signals, power, or both audio signals and power can pass through the cables in either direction.

In embodiments, the connector can simultaneously provide audio signals from at least one of: a vehicle and an extra-vehicular source, while providing power from the vehicle to electrically operate a noise-reduction device contained in an ear-protection device worn under a helmet for use while operating the vehicle.

Figure 1:
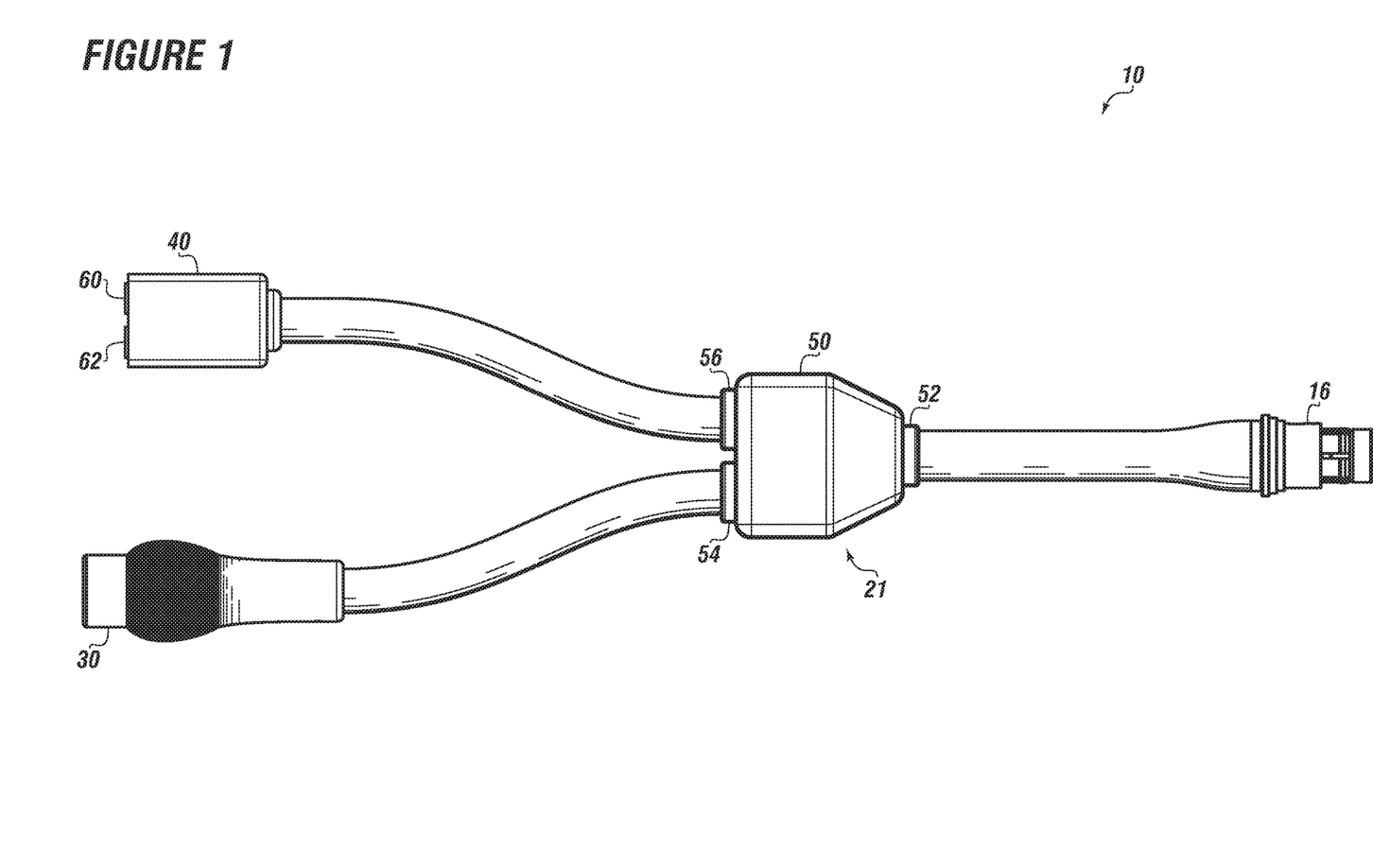
FIG. 1 depicts a top view of the connector according to one or more embodiments.

Turning now to the Figures, FIG. 1 depicts a top view of the connector 10 according to one or more embodiments.

Turning now to the Figures, FIG. 1 depicts a top view of the connector according to one or more embodiments.

The connector 10 can have a multi-pin connector 16. In embodiments, the multi-pin connector 16 can be configured to accept a plurality of different audio signal and power cables with differing pin configurations.

In embodiments, the differing pin configurations can have but is not limited to, from 1 pin to 14 pins, which can be configured to transfer audio signals, power, and audio signals and power. In further embodiments, the multi-pin connector 16 can have overmolding on the outside of the connector to provide a waterproof connection and shielding for the wires running through the multi-pin connector 16. Examples of usable multi-pin connectors 16 can be from 0.5 millimeters to 0.8 millimeters in length, ranging from 4.0 amps to 4.4 amps. In further embodiments, the multi-pin connector 16 can have a voltage less than or equal to 250 volts (DC). However, the multi-pin connector can vary in size depending upon the application.

The connector 10 can have a multi-pin signal separator 21 for receiving audio signals, power, and audio signals and power from the multi-pin connector 16. In embodiments, the multi-pin signal separator 21 can vary in size depending upon the application; however, by example, the multi-pin signal separator can be from 0.5 of an inch to 6 inches in width, 0.5 of an inch to 6 inches in length, and 1/16 of an inch to 2 inches in thickness.

In embodiments, the multi-pin signal separator 21 can be contained in a housing 50. In embodiments, the housing 50 can be a plastic or a rubberized material. In further embodiments, the housing 50 can be water resistance, electrical and magnetic interference protection, and impact resistance, or manufactured to civil and military standards for flight.

In embodiments, the multi-pin signal separator 21 can be configured to isolate all audio signals from the power being transferred from the multi-pin connector 16 or isolate some or a portion of the audio signals from the power being transferred from the multi-pin connector 16.

The multi-pin signal separator 21 can have an audio in port 52 for receiving audio signals, power, and combinations thereof from the multi-pin connector 16.

The multi-pin signal separator 21 can have a ground power audio port 54 for transferring audio signals, power, and combinations thereof from the multi-pin connector 16 to a ground, power, and audio signal connector 30.

The multi-pin signal separator 21 can have an audio out port 56 for transferring audio signal to an audio output 40.

The audio output 40 can transfer audio signals to an in-car system, such as earbuds, earplugs, headphones, or the like. In embodiments, the in-ear system can be custom made, so that the in-ear system can be worn beneath an ear-protection device while wearing a helmet.

In embodiments, the ground, power, and audio signal connector 30 can prevent audio signal from entering a helmet worn by the user.

In embodiments, the audio output 40 can have a plurality of audio outlets for delivering audio signals. In embodiments, the audio output 40 can be configured to accept a plurality of different audio cords with differing pin configurations.

In embodiments, the audio output 40 can provide a first audio outlet 60 and a second audio outlet 62. In further embodiments, multiple audio outlets can be used or just one audio outlet can be used.

In embodiments, the multi-pin signal separator 21 can have or be in communication with an attenuation device, such as an attenuator, or any electronic devices that reduces the power of a signal without appreciably distorting its waveform, a wireless device, such as a BLUETOOTH®, wi-fi, and ANT+, and a wireless adapter.

In embodiments, the ground, power, and audio signal connector 30 can be in communication with the multi-pin connector 16 for transferring the audio signals and power received by the multi-pin connector 16 to a noise-reduction device. In embodiments, the ground, power, and audio signal connector 30 can be configured to accept a plurality of different power cords for different noise-protection devices having differing pin configurations.

In embodiments, the ground, power, and audio signal connector can be in communication with the multi-pin connector for transferring the audio signals and power received by the multi-pin connector to a noise-reduction device. In embodiments, the ground, power, and audio signal connector can be configured to accept a plurality of different power cords for different noise-protection devices having differing pin configurations.

In embodiments, the connector 10 can be used with a plurality of different interface communication connectors, ear-protection device cords, and in-ear system cords, wherein each cable or cord can have different pin configurations. In embodiments, each cable or cord can be used without requiring any adapters.

Figure 2:
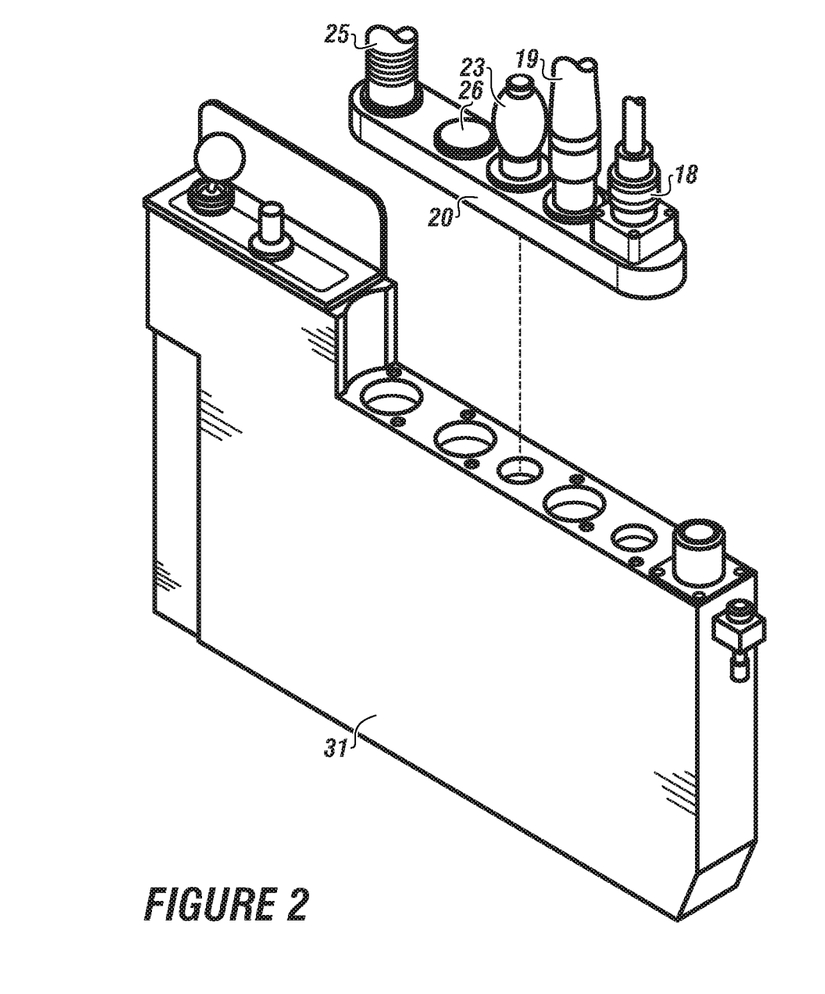
FIG. 2 depicts an isometric view of an interface assembly engaging an interface multifunction connector according to one or more embodiments.

FIG. 2 depicts an isometric view of an interface assembly engaging an interface multifunction connector according to one or more embodiments.

An interface multifunction connector 20 is depicted with an interface communication connector 18 as well as additional connector ports. In embodiments, the additional connector ports can be ports for an anti-g suit connector 19, an oxygen hose connector 25, an expansion port 26, and a pilot-locking mechanism 23.

In embodiments, the power carried by the interface communication connector 18 can be any voltage usable with the connector, such as 28-volt DC current. In further embodiments, voltages can be used from 1.5 volts to 4 volts. In even more embodiments, 9 volts can be passed by the interface communication connector 18.

The interface communication connector 18 of the interface multifunction connector 20 can engage an interface assembly 31.

The multi-pin connector of the connector can be used for receiving the audio signals, power, or both from the interface communication connector 18 of the interface multifunction connector 20, which engages the interface assembly 31 connected to the vehicle or the extra-vehicular source.

The multi-pin connector can be configured to simultaneously and selectively transfer power from the interface assembly to a noise-reduction device contained in an ear-protection device worn by the user, to reduce noise and send and transfer clear audio transmissions.

Figure 3:
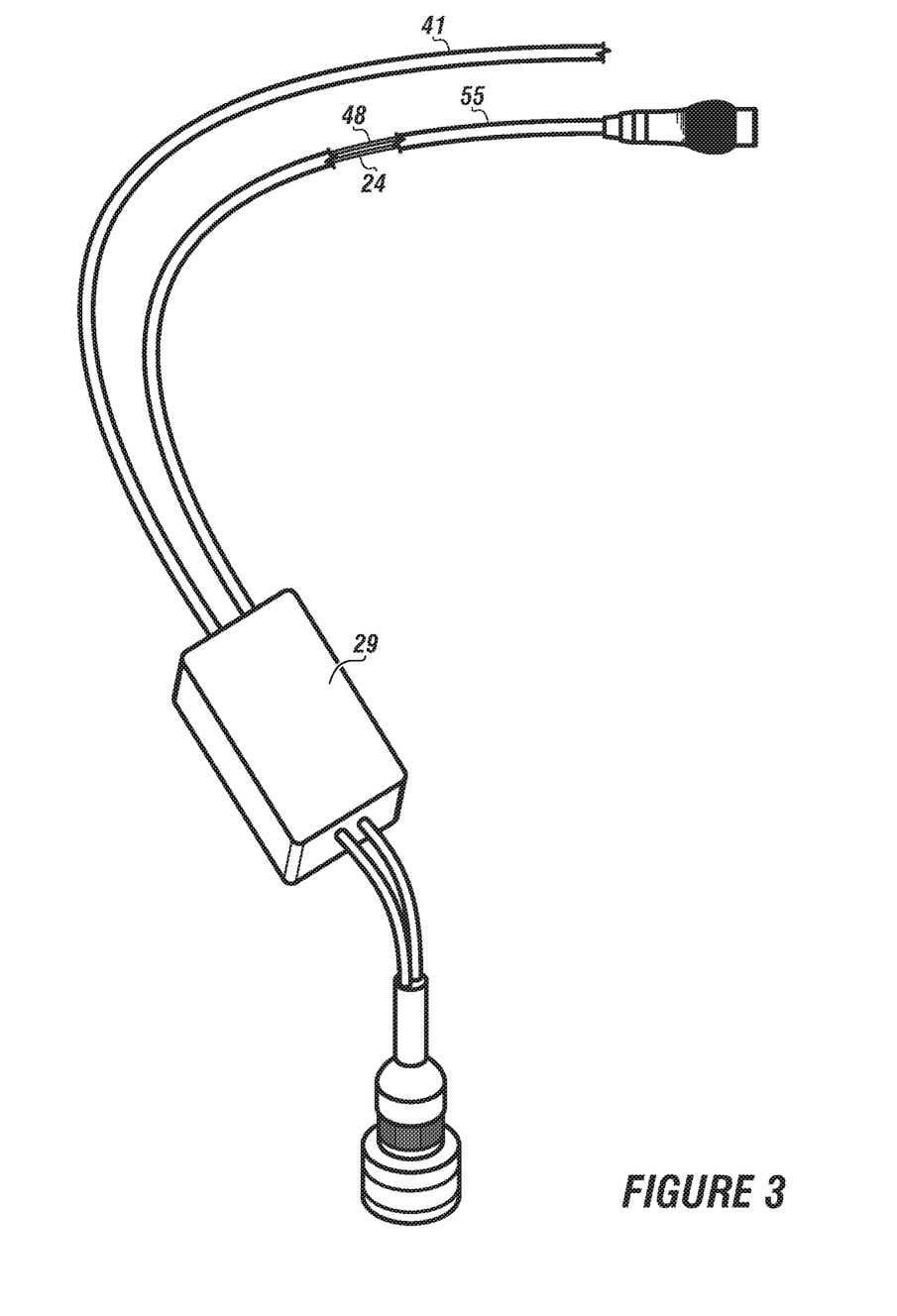
FIG. 3 depicts a partial cut away view of audio signals and power in an audio signal and power cable according to one or more embodiments.

An audio input signal cable, such as 41, can transmit audio signals, such as voice commands, from an audio input device, in which the audio signals can then be transferred through the interface communication connector to the interface assembly ultimately to a vehicle, to an extra-vehicular source, or both. In embodiments, the vehicle can communicate with the extra-vehicular source, such as a control tower.

An audio input signal cable, such as 41a, can transmit audio signals, such as voice commands, from an audio input device, in which the audio signals can then be transferred through the interface communication connector to the interface assembly ultimately to a vehicle, to an extra-vehicular source, or both. In embodiments, the vehicle can communicate with the extra-vehicular source, such as a control tower.

The audio signal and power cable 55 can engage or be in communication with the multi-pin connector, the interface communication connector, or both. Audio signals 24, power 48, or both can be contained in and move through the audio signal and power cable 55.

In embodiments, a switch 29 can be toggled to transfer the power 48 to a noise-reduction device when the switch 29 is toggled to an "on" position. The switch 29 can be turned off when the switch 29 is toggled to an "off" position. In embodiments, the switch 29 can be a depressible button or a voice activated switch. In further embodiments, the switch 29 can be a "switchable feature".

Figure 4:
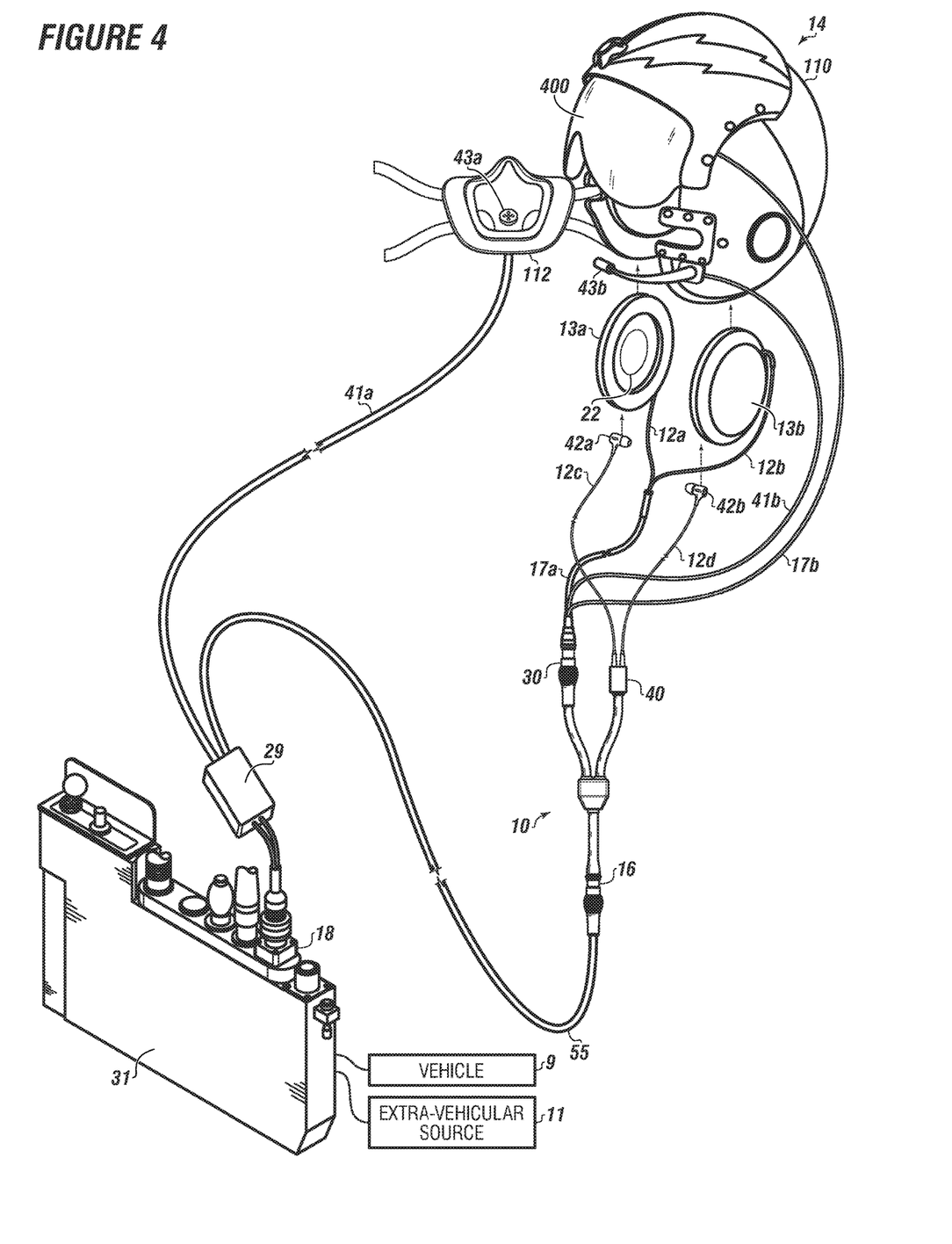
FIG. 4 depicts the connector in use with a helmet connected to a vehicle according to one or more embodiments.

FIG. 4 depicts the connector in use with a helmet 14 connected to a vehicle 9 according to one or more embodiments.

The connector 10 can be connected to or in communication with a helmet 14 and the interface assembly 31 that can further communicate with the vehicle 9, an extra-vehicular source 11, or both. In embodiments, the helmet 14 can be a multi-signal, multi-power receiving helmet, which means that it can be wired or in wireless communication to transmit audio signals, power, or both, such as through BLUETOOTH® technology.

In embodiments, the helmet 14 can have at least one ear-protection device 13a and 13b. In embodiments, each ear-protection device 13a and 13b can contain a noise-reduction device 22.

The helmet 14 can be formed by a hard-shell head covering 110.

The at least one ear-protection device 13a and 13b can connect with audio and power cords 12a and 12b respectively, which can each engage the ground, power, and audio signal connector 30 of the connector 10.

The in-ear system 42a and 42b can connect to the audio output 40 of the connector 10 with audio and power cords 12c and 12d respectively.

In embodiments, a first power and audio cord 17a can provide power and audio to the at least one ear-protection device 13a and 13b, while a second power and audio cord 17b can provide power to a device 400, such as a night vision device, mounted to the helmet 14 and audio signals to speakers installed in the helmet 14.

The helmet 14 can support at least one device 400 connecting to the ground, power, and audio signal connector 30.

The device 400 can be at least one of: a night vision device, a night vision goggle, a lip light, and a night vision monocular.

In embodiments, the first power and audio cord 17a and the second power and audio cord 17b can be used to provide power to a recording device mounted to the helmet 14.

A first audio input device 43a can be a microphone in a mask 112. The first audio input device 43a can connect to a first audio input signal cable 41a through the switch 29 to the interface communication connector 18. In embodiments, the switch 29 is not required.

A second audio input device 43b can be a microphone attached to the helmet 14 but not contained in the mask 112. The second audio input device 43b can connect to a second audio input cable 41b through the switch 29 to the interface communication connector 18. In embodiments, the second audio input device 43b can be a boom microphone.

The first audio input device 43a or the second audio input device 43b can provide audio to the interface communication connector 18 which can transfer spoken words to the vehicle 9 and/or to the extra-vehicular source 11.

The power transferred by the connector 10 can be a voltage appropriate for powering the at least one device 400.

The multi-pin connector 16 of the connector 10 can be connected to or in communication with the audio signal and power cable 55, which can further engage the interface communication connector 18.

In embodiments, the connector 10 can be used with a plurality of different interface communication connectors and different audio and power cords, each having different pin configurations. In embodiments, the connector can be used without requiring any adapters. In embodiments, additional adapters can be used when needed and can be connected within the system, such as through the multi-pin connector, ground, power, and audio signal connector, the audio output, or near the switch.

Figure 5:
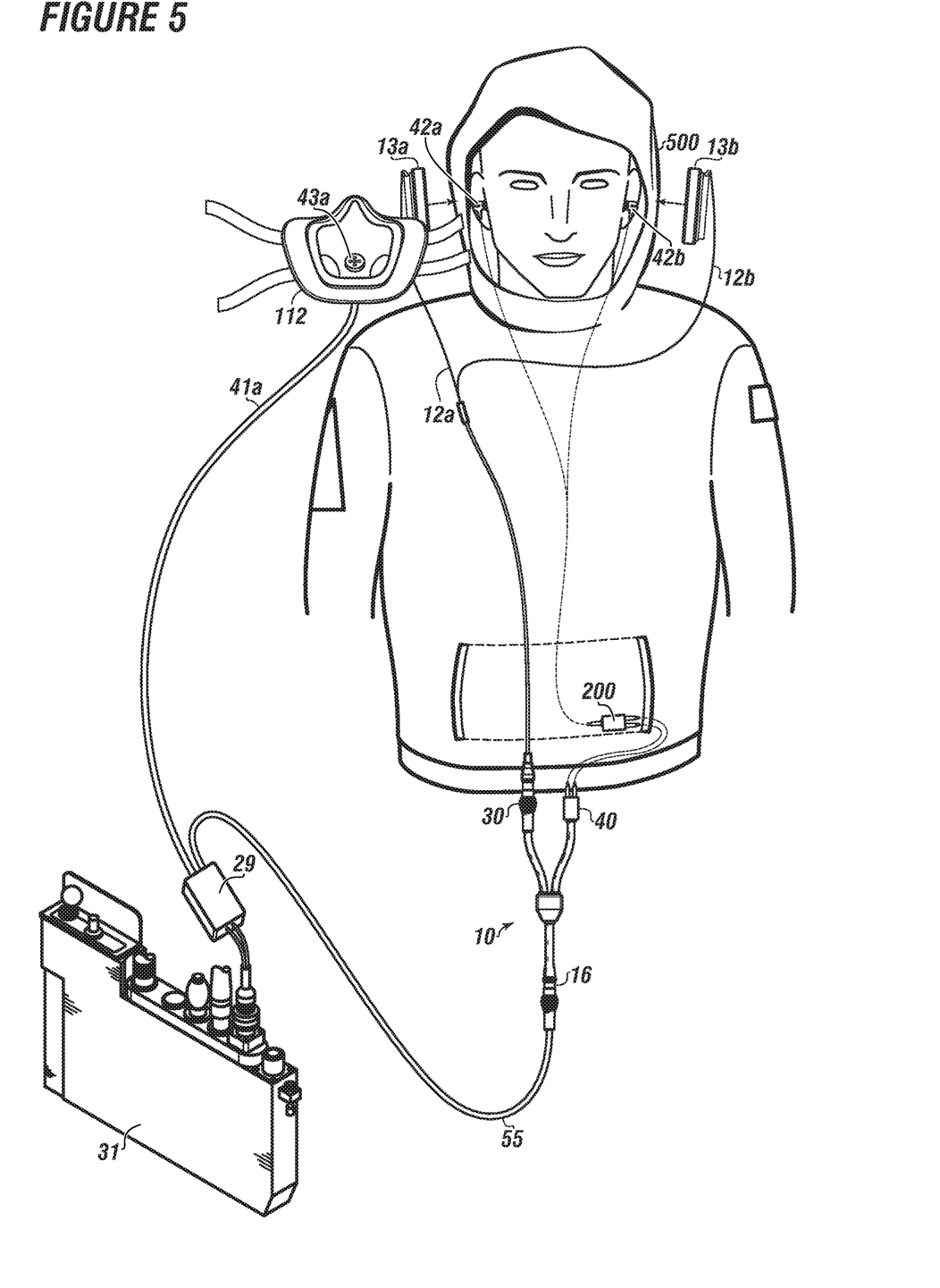
FIG. 5 shows the connector usable with a garment according to one or more embodiments.

In embodiments and with additional reference to FIG. 5, the multi-pin connector 16, interface communication connector 18, and ground, power, and audio signal connector 30, can additionally be configured to act as a ground between the helmet 14 and the vehicle 9, the extra-vehicular source 11, or both to prevent electrical shock between the user and the vehicle 9, the extra-vehicular source 11, or both as well as to prevent ground voltage loops.

The connector 10 can receive and separate audio signals which can include at least one of: an air traffic control communication; communication from or to another airborne asset; communication from or to a ground based asset; in vehicle communication from crew members; and a vehicle originating communication further including at least one of: a vehicle system advisory; a vehicle system warning; and a vehicle malfunction alert which can transmit the alert from an audio control system of a vehicle.

FIG. 5 depicts the connector usable with a garment according to one or more embodiments.

In embodiments, the connector 10 can be usable with a garment 500. In embodiments, the garment can be made of protective flexible fabric. In embodiments, the garment can be configured to be worn by a user.

The garment 500 can be any wearable item, such as a hoodie, a sweater, a jacket, a pullover, an item that can cover the head, neck, or shoulders of a person, or the like.

In embodiments, the garment 500 can be at least one of: a fire-resistant fabric; a fabric resistant to chemical exposure; a fabric that aids in protecting a user from nuclear fallout; and a fabric resistant to biological agents.

The connector 10 is depicted with the multi-pin connector 16, the ground, power, and audio signal connector 30, and the audio output 40.

The garment 500 can be used in connection with or in communication with the audio output 40 and/or the in-ear system 42a and 42b, such that a portion of the in-ear system 42a and 42b or a portion of the audio output 40 can be under or through the garment 500, such as through audio and power cords.

In embodiments, an adapter 200 can connect to the audio output 40. In embodiments, the adapter 200 can be configured or constructed to fit into a pocket, sewn into the garment, or manufactured in the garment. The garment can have through holes, such as near the neck portion or the draw string area, where power and audio cords 12a and 12b, the first audio input signal cable 41a, or various combinations of cords and cables can be inserted through these areas and connect with the in-ear system 42a and 42b.

In embodiments, the at least one ear-protection device 13a and 13b can cover the in-ear system 42a and 42b respectively.

The audio and power cords 12a and 12b can connect to the ground, power, and audio signal connector 30.

In embodiments, the garment 500 can be attached to the mask 112. In embodiments, the mask 112 can be a respirator.

The mask 112 can contain the first audio input device 43a which can engage the first audio input signal cable 41a to transmit messages to the interface communication connector that can engage the interface assembly 31. The switch 29 is also depicted.

The multi-pin connector 16 can provide a connection to communicate audio signals and power through the audio signal and power cable 55. The audio signal and power cable 55 can receive audio signals and power from the interface communication connector of the interface multifunction connector that can engage the interface assembly 31.

The multi-pin connector 16 is depicted to accept a plurality of different audio signal and power cables with differing pin configurations.

Figure 6:
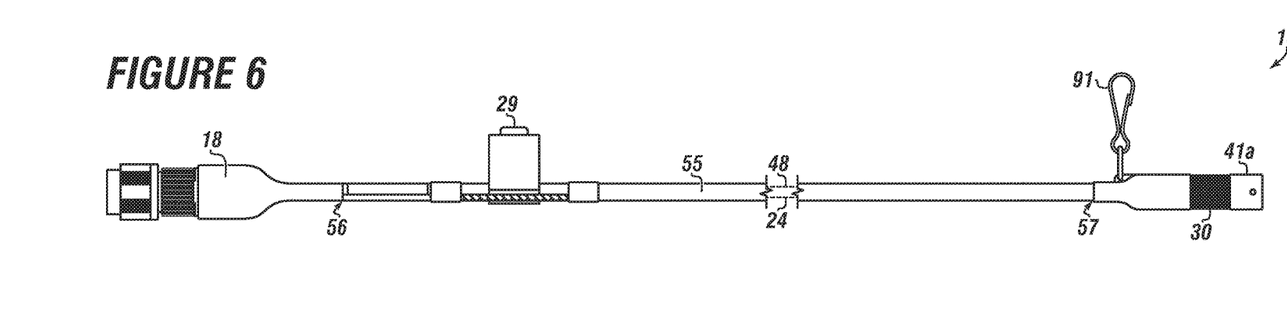
FIG. 6 shows another embodiment of the connector that includes, for example, a switch, an audio signal and power cable, interface communication connector, an audio input signal cable, and a ground, power, and audio signal connector.

FIG. 6 depicts an example embodiment of the connector 10 in a linear arrangement. The connector 10 can include an audio signal and power cable 55, which may have an interface communication connector 18 at or at least proximate to its 55 first end 56. Audio signals 24, power 48, or both may travel through any portion or the entirety of the audio signal and power cable 55. At or at least proximate to the second end 57 of the audio signal and power cable 55 is a ground, power, and audio signal connector 30, which may or may not interface with at least a first audio input signal cable 41a, which may mate with an undepicted audio input device(s) for transmission of input audio signals. The audio signal and power cable 55 and at least a first audio input signal cable 41a may be glued together, corded together, contained within a sheath that may or may not be elastomeric, or otherwise bundled together so as to protect and contain the connector's 10 two or more cables, e.g., 55, 41a, 41b, etc. As an ordinarily skilled artisan knows, a sheath at least partly envelopes cables, and is akin to the fatty sheath around nerve fibers. In various embodiments, the first audio input signal cable 41a, as well as any additional audio input signal cables such as 41b discussed previously in this disclosure, may run alongside a portion or the entirety of the audio signal and power cable 55 or be buried within the audio signal and power cable 55, i.e., coaxial; equally but oppositely, the audio signal and power cable 55 may be buried within at least the first audio input signal cable 41a or another cable of the connector 10.

The sheath or other shielding for the audio signal and power cable 55 is to provide a Faraday cage that serves to block electromagnetic fields. The purpose of grounding sheath or other shielding is to conduct as much noise as possible to the ground. If the connector is not grounded, then the noise remains static, which lowers the protective effect of the shielding.

Figure 7:
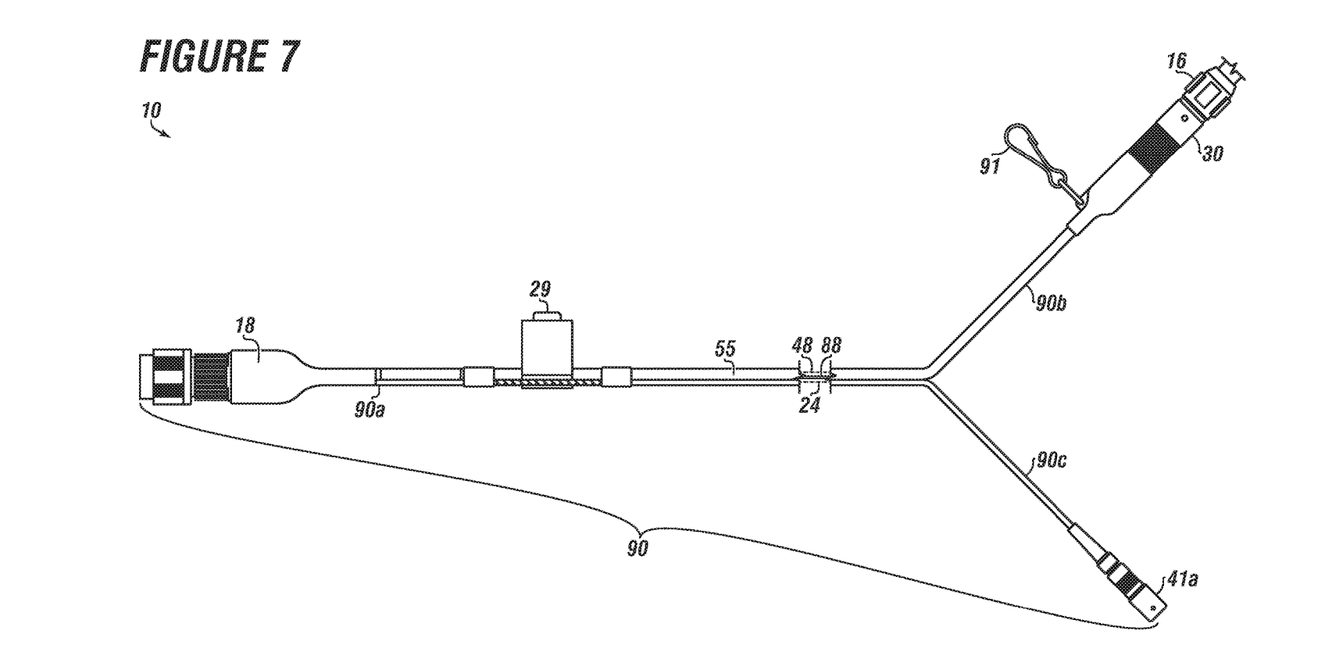
FIG. 7 shows another embodiment of the connector that includes, for example, a switch, an audio signal and power cable, interface communication connector, an audio input signal cable, and a ground, power, and audio signal connector.

Turning now to FIG. 7, another example embodiment is disclosed that may or may not be viewed as a variation of the example embodiment depicted in FIG. 6. Depicted in FIG. 7 is a connector 10, which from a global perspective may be described as having a y-shape 90. The connector 10 may include an audio signal and power cable 55. At or at least proximate to a first terminus 90a of the audio signal and power cable 55, disposed is an interface communication connector 18. Audio signals 24, power 48, or both can be contained in and move through the audio signal and power cable 55, which may comprise a sheath that surrounds one or multiple cables that carry the power and audio signals. Disposed on the audio signal and power cable 55 is a switch 29, which may be at the location shown in FIG. 7; other locations for the switch 29 along the audio signal and power cable 55 are also possible in other embodiments. The switch 29 may be removably or irremovably integrated into audio signal and power cable 55.

Generally, the audio signal and power cable 55 of the connector 10 is flexible so as to enable free and easy movement into various configurations. In some embodiments, this flexibility includes some rigidity so as to allow bending of the audio signal and power cable 55 into fixed positions; these positions, however, are easily reversed or changed to other positions simply by bending the audio signal and power cable 55 again. That is, the audio signal and power cable 55 may include one or more rigid members 88 to permit bending the audio signal and power cable 55 into a fixed position. The rigidity for fixing the position may be enabled by metal wiring or other formable material within the sheath that surrounds the audio signal and power cable 55.

The audio signal and power cable 55 branches on the opposite end of the audio signal and power cable 55 from the first terminus 90a. In one embodiment, the audio signal and power cable 55 branches into a first branch 90b and a second branch 90c. These branches 90b, 90c may coalesce or otherwise combine into a single connection point with the audio signal and power cable 55 in order to form the y-shape 90 comprising the connector 10. Here, the audio signal and power cable 55 may engage or be in communication with a ground, power, and audio signal connector 30 that may be disposed along the first branch 90b. Additionally and alternatively, the audio signal and power cable 55 may engage or be in communication with first audio input signal cable 41a that may be disposed along the second branch 90c. In a further example embodiment, the ground, power, and audio signal connector 30 may be connected to a multi-pin connector 16 in order to accept one or more of the plurality of different audio signal cables, power cables, or both from devices having differing pin configurations. The multi-pin connector 16 may also be in communication with the ground, power, and audio signal connector 30 embodiment depicted in FIG. 6 even though FIG. 6 does not show that additional example embodiment.

In some embodiments, one or multiple clips, such as clip 91, may append to any portion(s) of the multi-pin signal separator 21 discussed again in the next section and/or to any portion(s) of the interface communication connector 18, first and/or second audio input signal cable 41a and/or 41b, ground, power, and audio signal connector 30, and/or multi-pin connector 16. Equally, such clips could appear in other embodiments, including the one depicted in FIG. 6.

Figure 8:
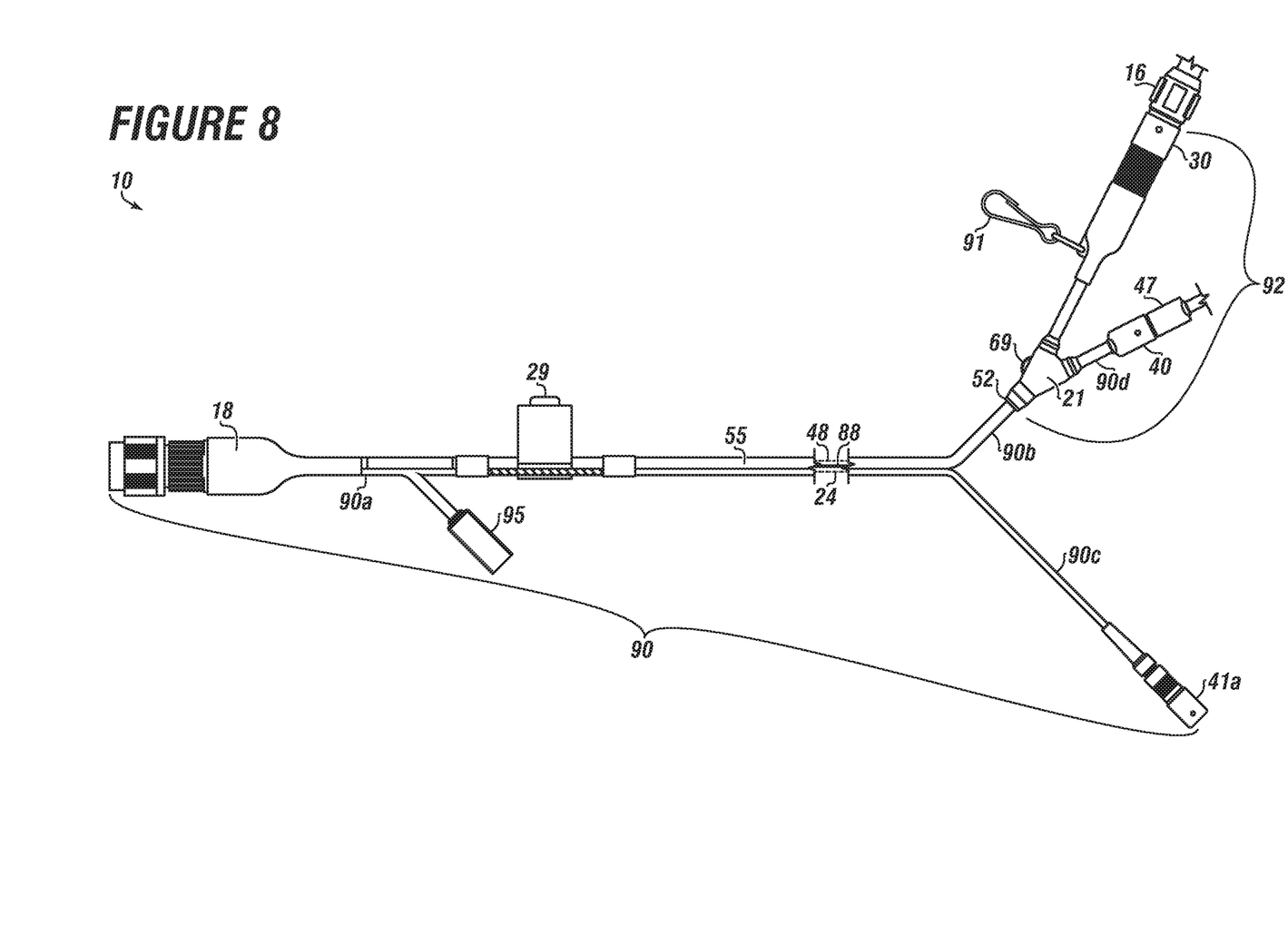
FIG. 8 shows another embodiment of the connector that includes, for example, a switch, an audio signal and power cable, interface communication connector, an audio input signal cable, a input cable (e.g., a data packet input cable or ground power audio signal cable), an audio out port, an adapter, and a ground, power, an audio signal connector in communication with a multi-pin signal separator, and a multi-pin signal separator.
Figure 9:
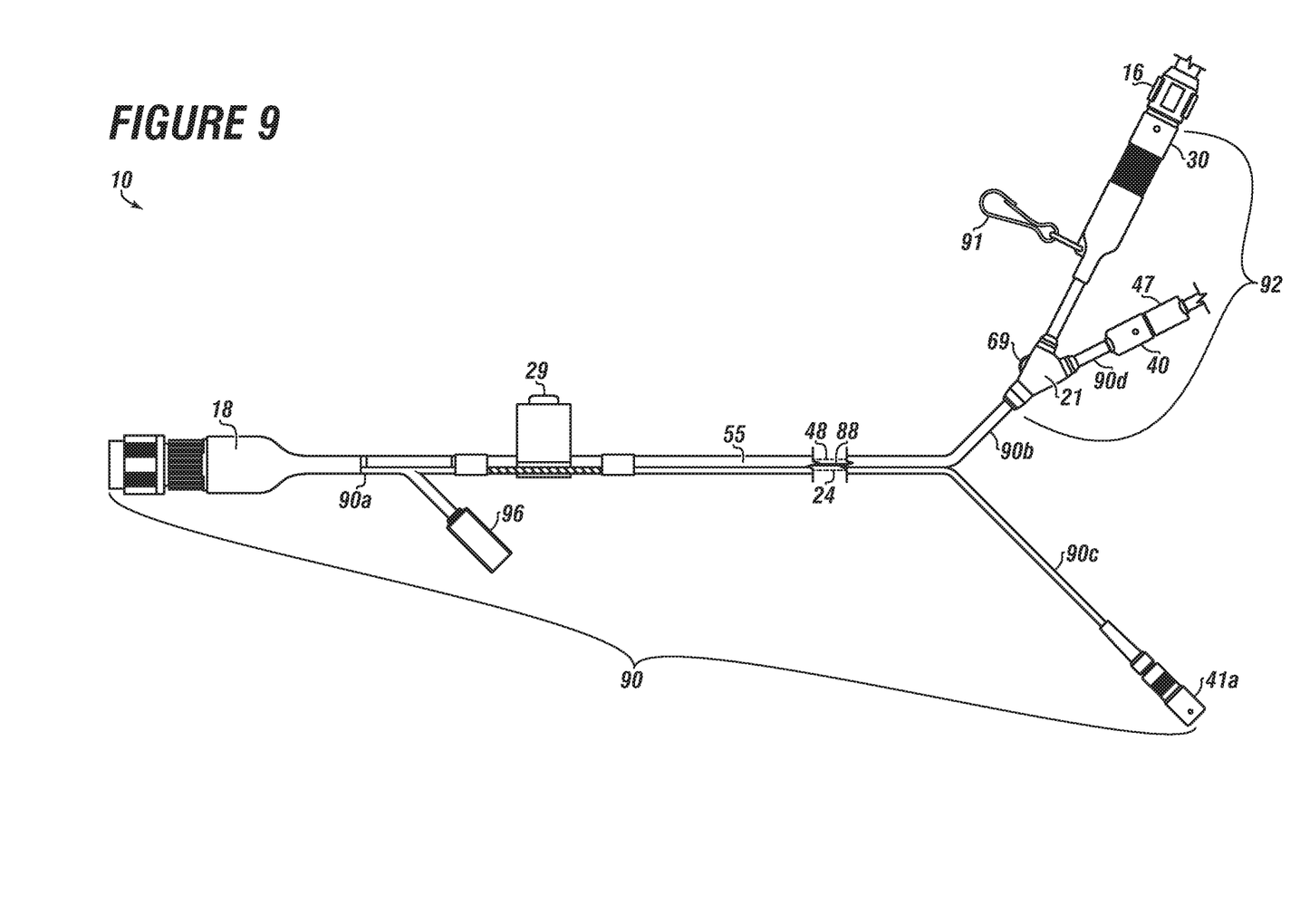
FIG. 9 shows another embodiment of the connector that includes, for example, a switch, an audio signal and power cable, interface communication connector, an audio input signal cable, ground power audio signal cables, an audio out port, an adapter, and a ground, power, an audio signal connector in communication with a multi-pin signal separator, and a multi-pin signal separator.

Moving on, FIG. 8 shows a further example embodiment of FIG. 7 with additional componentry. For example, FIG. 8 depicts an input cable 95 that may receive audio, data packets, or both. To the extent that the input cable 95 accepts data packets, it may be called a data packet input cable, but that does not necessarily exclude the possibility that the same input cable 95 could also accept audio input. In short, one or more inputs cables 95 could be disposed or substituted for other input cables on the example embodiments disclosed at least at FIGS. 6 and 7. As alternative embodiments, input cable 95 could be a ground power audio signal connector 96 to allow power and/or audio at a different location of the connector 10 as shown in FIG. 9. Additionally and alternatively, instead of the audio out port 40 depicted in FIG. 8, the audio out port 40 could be a ground power audio signal connector 96 as shown in FIG. 9.

FIG. 8 also depicts a multi-pin signal separator 21 on the first branch 90b. The multi-pin signal separator 21 may have an audio in port 52 for receiving the audio signal and power cable 55. On the opposite side of the audio in port 52, the multi-pin signal separator 21 may include a ground, power, audio port 54 for transferring audio signals, power, and combinations thereof through the audio signal and power cable 55 in communication with the ground, power, and audio connector 30. In addition, the multi-pin signal separator 21 may include an audio out port 40, which itself 40 can have a plurality of audio outlets for receiving audio signals. As shown in FIG. 8, the audio out port 40 is a third branch 90d of the connector 10. In further embodiments, the audio out port 40 may include an adapter 47, which may be interchangeable, for connecting to different-sized audio devices, such as in-ear systems, hearing protection devices that contain speakers, etc.

The multi-pin signal separator 21 can also include a volume and/or impedance controller 69, which may be controlled manually, automatically, remotely, and/or locally. Control is accomplished by enabling logic reduced to hardware and/or software. Activation of the controller 69 may occur digitally by depressing one or more buttons disposed on or in association the multi-pin signal separator 21, by interacting with a remote-control device in wired or wireless connection with the volume and/or impedance controller 69 and optionally the multi-pin signal separator 21, automatically by logic deciphering and adjusting based on environmental dielectrics, spacing and other considerations, or otherwise.

As depicted, the multi-pin signal separator 21 is substantially triangular so as to permit the formation of a second y-shape 92. However, in other example embodiments, the multi-pin signal separator 21 may have a different shape, such as being substantially quadrilateral, octagonal, dodecahedral, spherical, and so forth. And through use of such other different shapes, more than two ports, e.g., three, five, eight, etc. audio in and/or out ports, are possible as compared to just the two ports 40, 54 shown in FIG. 8. Thus, the interconnectivity and additional y-shapes (or other shapes) possible through variations of the disclosed connectors 10 are limitless.

With regard to the cables discussed in this disclosure, for example, the audio signal and power cable 55, first audio input signal cable 41*a*, the second audio input signal cable 41*b*, and so forth, any and all such cables can have embedded protocols such as BLUETOOTH®, Wi-Fi, Z WAVE™, etc. that enable audio, internet, and/or other data communication between external device(s) and such cable(s).

Below, further example embodiments of the disclosed invention are presented in a claim-like format:

1. A connector for providing audio signals comprising:
    an audio signal and power cable having a first end and a second end;
    an interface communication connector disposed at least proximate to the first end;
    a ground, power, and audio signal connector disposed at least proximate to the second end, wherein the ground, power, and audio signal connector is configured to accept a plurality of different audio signal and power cables from different noise-protection devices having differing pin configurations; and
    at least a first audio input signal cable in contact with the audio signal and power cable, wherein the audio input signal cable is configured for transmitting one or more of the audio signals through the interface communication connector to at least one of a vehicle and an extra-vehicular source.
2. The connector of claim 1, wherein the second end branches to comprise:
    the ground, power, and audio signal connector disposed on a first branch; and
    the audio input signal cable disposed on a second branch.
3. The connector of claim 1, further comprising a switch disposed on the audio signal and power cable, wherein the switch controls power to one or more noise-reduction devices.
4. The connector of claim 1, further comprising one or more clips disposed on one or more portions of any one or more of the interface communication connector, the ground, power, and audio signal connector, the at least a first audio input signal cable, a multi-pin signal separator, a data packet input cable, and the audio signal and power cable, such as by overmolding, gluing or otherwise attaching a clip to the audio signal and power cable.
5. The connector of claim 1, wherein the audio signal and power cable and the at least a first audio input signal cable are coaxial.
6. The connector of claim 1, wherein at least a portion of the audio signal and power cable and the at least a first audio input signal cable are bundled within a sheath.
7. The connector of claim 1, wherein the audio signal and power cable is flexible.
8. The connector of claim 1, wherein the audio signal and power cable comprises one or more rigid members to permit bending the audio signal and power cable into a fixed position.
9. The connector of claim 1, further comprising a multi-pin connector for connecting to the ground, power and audio connector and accepting one or more of the plurality of different audio signal cables, power cables, or both from devices having differing pin configurations.
10. The connector of claim 1, further comprising an adapter for connecting to an audio out port in communication with the connector.
11. The connector of claim 1, wherein the connector is configured to receive one or more communication protocols comprising BLUETOOTH®, Wi-Fi, and Z WAVE™.
12. The connector of claim 1, wherein the audio signal and power cable is in communication with one or more of data packet input cables, audio input signal cables, audio in ports, audio out ports, ground power audio signal connectors, and adapters.
13. The connector of claim 1, further comprising a multi-pin signal separator in electrical and audio communication with the audio signal and power cable, which is in communication with the interface connector, wherein the multi-pin signal separator is disposed on the first branch and between the interface communication connector and the ground, power, and audio signal connector.
14. The connector of claim 13, wherein the multi-pin signal separator comprises at least one audio in port, at least one audio out port, or both.
15. The connector of claim 14, wherein one or more adapters are connected to the at least one audio in port, the at least one audio out port, or both.
16. The connector of claim 13, wherein the multi-pin signal separator comprises a ground power audio port.
17. The connector of claim 13, wherein the multi-pin signal separator comprises a volume controller, an impedance controller or combination thereof.
18. The connector of claim 13, wherein the impedance controller or the combination thereof adjusts impedance automatically.
19. The connector of claim 13, wherein the multi-pin separator has a shape comprising substantially triangular, substantially quadrilateral, substantially dodecahedral, substantially octagonal or substantially spherical.
20. The connector of claim 13, further comprising one or more clips disposed on one or more portions of the multi-pin signal separator.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations. The use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The inclusion or discussion of a reference is not an admission that it is prior art to the present invention, especially any reference that may have a publication date after the priority date of this application. The disclosures of all patents, patent applications, and publications cited herein are hereby incorporated by reference, to the extent they provide background knowledge; or exemplary, procedural or other details supplementary to those set forth herein.

What is claimed is:

1. A connector for providing audio signals comprising:
   an audio signal and power cable having a first end and a second end, wherein the second end branches to comprise a first branch and a second branch;
   an interface communication connector disposed at least proximate to the first end;
   a ground, power, and audio signal connector disposed on the first branch, wherein the ground, power, and audio signal connector is configured to accept a plurality of different audio signal cables, power cables, or combined audio and power cables from different noise-protection devices having differing pin configurations;
   at least one audio input signal cable disposed on the second branch and in contact with the audio signal and power cable, wherein the at least one audio input signal cable is configured for transmitting one or more of the audio signals; and
   a multi-pin signal separator in electrical and audio communication with the audio signal and power cable, wherein the multi-pin signal separator is disposed between the interface communication connector and a multi-pin connector.

2. The connector of claim 1, further comprising a switch disposed on the audio signal and power cable, wherein the switch controls power to one or more noise-reduction devices.

3. The connector of claim 1, further comprising one or more clips disposed on one or more portions of any one or more of the interface communication connector, the ground, power, and audio signal connector, the at least one audio input signal cable, the multi-pin signal separator, a data packet input cable, and the audio signal and power cable.

4. The connector of claim 1, wherein the audio signal and power cable and the at least one audio input signal cable are coaxial.

5. The connector of claim 1, wherein at least a portion of the audio signal and power cable and the at least one audio input signal cable are bundled within a sheath.

6. The connector of claim 1, wherein the audio signal and power cable is flexible.

7. The connector of claim 1, wherein the audio signal and power cable comprise one or more rigid members to permit bending the audio signal and power cable into a fixed position.

8. The connector of claim 1, wherein the multi-pin connector is configured to accept one or more of the plurality of different audio signal cables, power cables, or both from devices having differing pin configurations.

9. The connector of claim 1, further comprising an adapter for connecting to an audio out port in communication with the connector for providing audio signals.

10. The connector of claim 1, wherein the connector for providing audio signals is configured to receive one or more communication protocols.

11. The connector of claim 1, wherein the audio signal and power cable is in communication with one or more of data packet input cables, audio input signal cables, audio in ports, audio out ports, ground power audio signal connectors, and adapters.

12. The connector of claim 1, wherein the
   a multi-pin connector is configured for connecting to the ground, power and audio connector.

13. The connector of claim 1, wherein the multi-pin signal separator comprises at least one audio in port, at least one audio out port, or both.

14. The connector of claim 13, wherein one or more adapters are connected to the at least one audio in port, the at least one audio out port, or both.

15. The connector of claim 1, wherein the multi-pin signal separator comprises a ground power audio port.

16. The connector of claim 1, wherein the multi-pin signal separator comprises a volume controller, an impedance controller or combination thereof.

17. The connector of claim 16, wherein the impedance controller or the combination thereof adjusts impedance automatically.

18. The connector of claim 1, wherein the multi-pin signal separator has a shape comprising substantially triangular, substantially quadrilateral, substantially dodecahedral, substantially octagonal or substantially spherical.

19. The connector of claim 1, further comprising one or more clips disposed on one or more portions of the multi-pin signal separator.

20. The connector of claim 1, further comprising an in-ear system for connecting to an audio out port in communication with the connector for providing audio signals.

* * * * *